April 6, 1943.   R. V. BURT ET AL   2,315,932
CONTAINER FILLING DEVICE AND METHOD
Filed July 31, 1940   4 Sheets-Sheet 1

INVENTORS
ROBERT V. BURT
AND NEIL MACNEALE.
BY Allen & Allen
ATTORNEYS.

April 6, 1943.  R. V. BURT ET AL  2,315,932
CONTAINER FILLING DEVICE AND METHOD
Filed July 31, 1940  4 Sheets-Sheet 3

INVENTORS.
ROBERT V. BURT
AND NEIL MACNEALE.
BY Allen & Allen
ATTORNEYS.

April 6, 1943.   R. V. BURT ET AL   2,315,932
CONTAINER FILLING DEVICE AND METHOD
Filed July 31, 1940   4 Sheets-Sheet 4

INVENTORS.
ROBERT V. BURT
AND NEIL MACNEALE.
BY Allen & Allen
ATTORNEYS.

Patented Apr. 6, 1943

2,315,932

UNITED STATES PATENT OFFICE 2,315,932

CONTAINER FILLING DEVICE AND METHOD

Robert V. Burt and Neil Macneale, Cincinnati, Ohio, assignors to The Procter & Gamble Company, Cincinnati, Ohio, a corporation of Ohio Application July 31, 1940, Serial No. 348,879

21 Claims. (Cl. 226—125)

Our invention relates to a device and a method for automatically filling containers with shortening or with other liquid, plastic, or semi-liquid materials. It is especially adapted to filling cans with shortening at a high rate of speed, with precise uniformity of the net weight of the contents of the filled cans, and in such manner as to produce uniformity of appearance and of consistency of the product in the cans and a smooth and pleasing top surface.

Our first object is to secure uniformity of weight of shortening filled into all containers.

A second object is to produce a packed shortening of uniform appearance and plasticity, as a result of uniformity of size and distribution of the minute bubbles of vesiculated air throughout the mass of shortening.

A third object is to fill cans or container with shortening at a high rate of speed without entraining or drilling extraneous air into the shortening, and in such a manner as to produce a smooth top surface of the shortening in the filled containers.

A fourth object is to provide means for quickly and temporarily discontinuing the flow of shortening into the containers while permitting quick resumption of filling with a minimum wastage of shortening which has set up or crystallized in the filling machine during the temporary period of shutdown.

Other objects are to fill containers with other liquid, semi-liquid, or plastic materials than shortening to accomplish similar objects as above set forth for shortening.

We will describe our invention as applied to ordinary plastic shortening although it is obvious that the same principles may be applied in the filling of other products having a liquid, semi-liquid, or plastic consistency, either with or with-, out the incorporation of air bubbles as described herinafter. Where air is mentioned it is to be, understood that other gases may be used in place of air.

Ordinary shortening as produced and packed in the past has lacked uniformity in appearance, in plasticity, and in the size and distribution of the bubbles of the so-called "vesiculated" air throughout the mass of shortening, and in the net weights of the contents of containers, which defects have been due to various causes. Ordinary shortening actually dissolves about eight per cent of air by volume when in equilibrium with the atmosphere at normal temperature and pressure. About seven per cent to fifteen per cent of excess or "vesiculated" air is commonly incorporated in shortenings to improve their whiteness, general appearance, and plasticity. The incorporation of this air is usually accomplished either by whipping it into the shortening after the latter has been chilled to a semi-plastic condition, much as air is whipped into eggs or cream in kitchen operations, or by forcing air into molten shortening in a confined space under pressure and then chilling and whipping the mixture to a semi-plastic condition. In either case the amount of air thus incorporated is bound to vary considerably from time to time. After the steps of incorporating the air and chilling the mass have been accomplished the semi-plastic shortening is pumped to the container filling operation. Usually the shortening is subjected to superatmospheric pressure, which may be from about 150 to about 600 pounds per square inch, and which is sufficient to cause all or nearly all of the air to dissolve in the shortening. In the container filling operation this pressure is suddenly released to substantially atmospheric pressure, and as a result the excess air comes out of solution in the form of small bubbles of "vesiculated air" distributed throughout the shortening.

When constant volumes of shortening measured at atmospheric pressure are filled into containers the weights in the various containers are bound to vary if there is any variation in the percentage of vesiculated air. We overcome this defect by measuring the material to be delivered to each container while it is still under a sufficiently high pressure to keep substantially all of the air dissolved in the shortening so that under these conditions equal measured volumes will have equal weights. We release the excess pressure from the shortening after the volume to be packed has been measured so that if there is any variation in different packages it is a variation of volume due to a variation in amount of vesiculated air, but not a variation of weight. Furthermore, our preferred method of measuring the volume of material under pressure is accurate regardless of such variations as may occur during normal operation in the pressure on the material delivered to the container filling operation.

Other defects of prior practice have been that the flow of shortening under high pressure had to be stopped at least momentarily between the filling of consecutive containers of a series, and also that this flow had to be retarded to control the rate of flow, both of which procedures unavoidably caused variations in pressure on the shortening containing vesiculated air which caused objectionable variations in the appearance of the product and oftentimes caused the formation of streaks of partially deaerated shortening or of shortening containing air bubbles of abnormal size. This is explained by the fact that a very abrupt release of pressure from the chilled shortening containing excess dissolved air is required if the air that comes out of solution is to appear as myriads of well distributed minute bubbles of uniform size. A slow or gradual or interrupted release in pressure has been found to give a less uniform whiteness of product than a single sudden release. We overcome these defects of the prior art by employing a single abrupt release of pressure and by maintaining a uniform and unvarying flow to the containers without any interruption between the filling of the various containers.

When heretofore the filling of containers with shortening, whose volume was measured while it was still under pressure, was speeded up by increasing the rate of flow of shortening into the container, entrainment of extraneous air or so-called "drilling" occurred which introduced undesired air bubbles of relatively large sizes, which bubbles eventually found their way to the surface in large part, thus ruining the smooth appearance of the surface. Also the increased rate of flow into the packages gave to the surface a wavy and uneven appearance. We find that the number of containers filled per minute hitherto considered as a safe limit can be greatly increased by our procedure in which the filling nozzle revolves with the container around the axis of a filling column or turret and continues delivering shortening into the container during a large part of the period of revolution of the filling column. In this way the rate of flow of shortening into the container is not increased, but the duration of the filling period is increased and two or more containers are filled simultaneously from the same machine. We accomplish this in a novel manner by filling each container in two or more stages, a procedure which has the further advantage of permitting the last portion of shortening to be introduced into the container at a much lower rate than the earlier portion or portions, thus insuring an unusually smooth surface and pleasing appearance.

When, in prior practice, the filling of containers had to be interrupted temporarily, the material in the volume measuring elements and the space behind same unavoidably crystallized or "set up" so that it was no longer in proper condition for filling after the apparatus had been shut down for a few minutes. This material had to be removed from the apparatus and scrapped. We have overcome this defect by providing a by-pass valve adapted to stop the flow of shortening from the high pressure into the low pressure part of the container filling system while maintaining the high pressure flow of shortening but temporarily diverting it to an overflow tank so that in this way the material in the high pressure parts of the filling apparatus, including the volume measuring elements, has no opportunity to set up during such temporary stoppage.

The accompanying drawings illustrate the parts of a typical automatic shortening filling machine suitable for use in carrying out our invention.

Figures 1, 2:
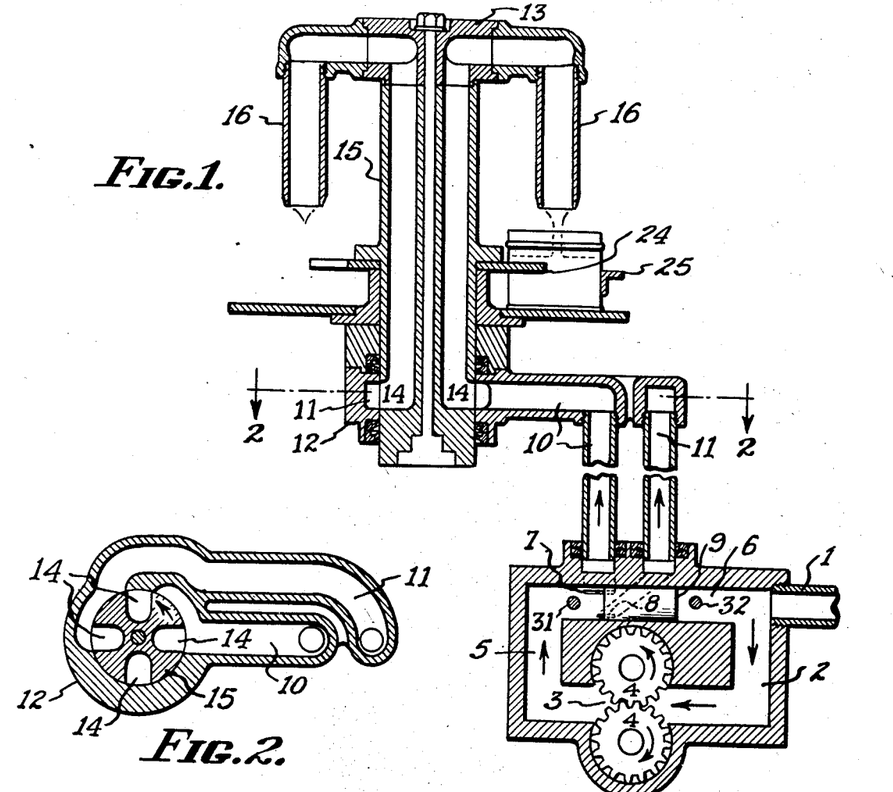
Figure 1 is a schematic sectional elevation view of a metering device, flow control means, and container filling assembly, in brief of those parts of a filling machine through which shortening flows during normal operation.
Figure 2 is a horizontal section on line 2—2 of Fig. 1.
Figure 3:
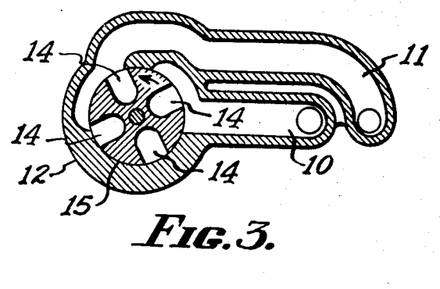
Figure 3 is the same as Fig. 2, except that the movable central part is turned a small fraction of a revolution beyond its position in Fig. 2.

In carrying out our process with the filling device illustrated in Figures 4–15, and in the elements shown schematically in Figures 1–3, the soft semi-plastic shortening, which has been cooled, has had the desired amount of vesiculated air whipped into it or otherwise incorporated, and has been subjected to sufficient pressure to dissolve most or all of this vesiculated air, enters the inlet 1 (in this and the next paragraph it will be found convenient to refer principally to Fig. 1 and Fig. 2) under high pressure, usually between 150 and 600 pounds per square inch, and passes through passage 2, which communicates with one end of cylinder 6, to and through the metering pump 3, which may be a gear pump of standard design having uniformly spaced teeth of uniform size and shape. The rotors 4 of this pump are driven at a predetermined and substantially constant speed by means of a motive power source, as for example, the electric motor 20 shown in Fig. 4 and Fig. 5. From this metering pump the shortening passes through passage 5 to the other end of cylinder 6, in which is a "floating" piston 9. The shortening leaves this cylinder through elongated outlet ports in the form of two narrow elongated "throttling" slits 7 and 8 cut lengthwise through the wall of the cylinder, each of which slits has a width of preferably about 1/32 to 1/16 inch and a depth (wall thickness) of preferably about 1/32 inch in a machine capable of filling 75 pounds or more of shortening per minute. These slits communicate respectively with low pressure passages 10 and 11, the space in these passages directly behind the slits preferably being so designed as to avoid any "dead spots" in which shortening may remain stagnant. The high pressure under which the shortening has been maintained up to this point is very abruptly released as the shortening quickly passes through these slits. All passages through which the shortening passes after leaving the slits are relatively much larger in cross sectional area than the slits themselves, in order to permit free passage of the expanded shortening at little more than atmospheric pressure.

Passages 10 and 11 direct two low pressure streams of shortening to two elongated openings in the concave cylindrical face of the stationary distributing block 12. Each of these openings has a width, measured in a direction parallel to the axis of said cylindrical face, about equal to the diameter of each of the passages 10 and 11 (see Figures 1 and 6) and a length, measured circumferentially around said cylindrical face, about equal to one fourth the circumference of said face (see Figures 2, 3, and 7). The relative positions of these two openings are such that their longitudinal center lines both lie in a plane perpendicular to the axis of said cylindrical face, these openings being separated by a distance at least equal to the width of each of the ports 14 as more specifically described hereinafter. The aforementioned cylindrical face of block 12 surrounds the convex face of a cylindrical member of the rotating filling column 13, this member having four uniformly spaced ports 14 in said convex face. Thus the longitudinal center lines of said openings in block 12 lie on a circle concentric with and in a plane perpendicular to the axis of rotation of said column 13. Each of ports 14 in turn receives shortening first from passage 10 leading from slit 7 and then from passage 11 leading from slit 8, as the rotary motion of column 13 moves each of the ports 14 past first the one and then the other of the two openings in the concave face of the distributing block 12 in the direction indicated by the arrow in Figures 2 and 3. From ports 14 the shortening passes through connecting passages in the vertical shaft 15, thence to and through filling nozzles 16 and thence into the containers.

The containers before filling are conveyed to the stationary table 21 (Fig. 4 and Fig. 5) by feed belt 22 and by the arms of the rotating star wheel 23; during filling they are caused to slide on this table around the shaft 15 of the filling column and are kept each under one of the nozzles by the action of the arms of the star wheel 24 and the retaining guide rail 25; and after they are filled with shortening they are automatically pushed from the table by the arms of the star wheel 26 and are carried away by conveyor 27. The ports 14, shaft 15, nozzles 16, and star wheel 24 are all assembled as parts of the filling column 13 (Fig. 1 and Fig. 6) and hence rotate as a unit. Automatic equipment for handling containers before, during, and after filling is well known and forms no part of our invention excepting in combination with the other mechanism by which our novel results are produced.

Figure 11:
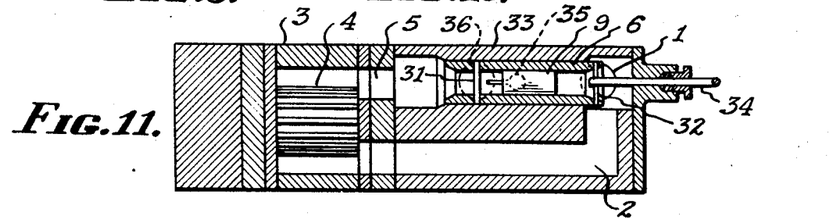
Figure 11 is a horizontal section on the line 11—11 of Fig. 8.
Figure 12:
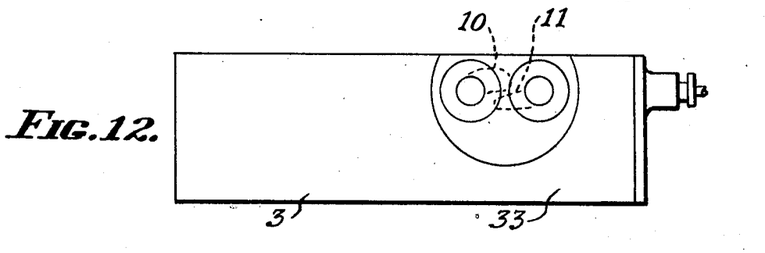
Figure 12 is a plan view of the parts illustrated in section in Fig. 11.
Figure 13:
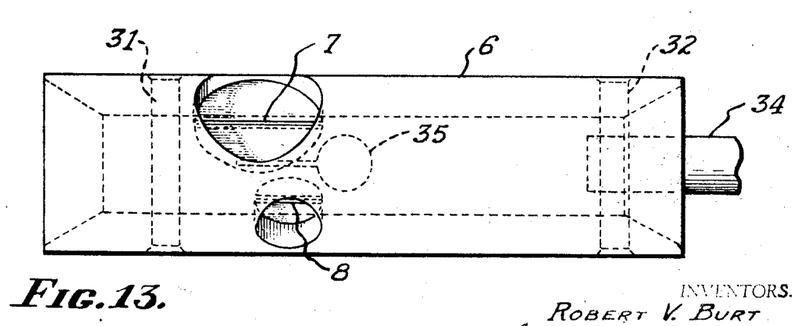
Figure 13 is a plan view, on a larger scale, of the member 6 of Figs. 8, 9, 10, and 11, and attached elements.
Figure 14:
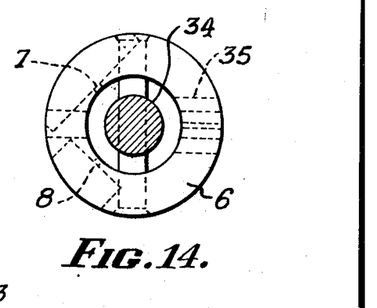
Figure 14 is an end elevation of the same member 6, and attached elements.
Figure 15:
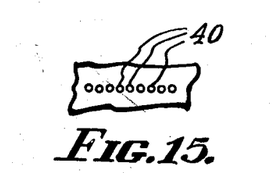
Figure 15 is a fragmentary view illustrating an alternate construction of the pressure release passage.

In the three preceding paragraphs those parts and functions of the filling machine having to do with its normal operation have been mentioned and pointed out in the drawings. At times it is desirable to discontinue the container filling operation for relatively brief periods, while maintaining the normal flow of chilled shortening through the filling line. This may be accomplished, in the machine here depicted in Figures 4 to 14, by sliding the cylinder 6 within its close fitting cylindrical casing in the block 33, by means of the rod 34 shown in Figures 8, 11 and 13 (which rod may be hand operated, but preferably is operated by means of a pneumatic plunger, not shown in the drawings), until opening 35 through the wall of cylinder 6 is brought into communication with bypass outlet 36 which conducts the shortening to an overflow tank, where it may be remelted, and from which it may be returned to the chilling, aerating, and packing operations. During this change of position of cylinder 6 the neighboring two slits 7 and 8 which are cut through the walls of cylinder 6 are simultaneously removed from communication with low pressure passages 10 and 11. (A slit cut through the wall of cylinder 6 to the left of and communicating with opening 35 is provided, as shown in Figures 11, 13 and 14, to prevent the building up of excess pressure during the brief interval while slits 7 and 8 are being removed from communication with passages 10 and 11 and before opening 35 is fully centered over outlet 36.) The flow of shortening is thus cut off from the filling head by this sleeve valve action of cylinder 6 but is permitted to continue through the metering pump and on to the overflow tank. At the same time the supply of empty containers may be stopped, if desired, by independent means. By reversing the setting of sleeve valve cylinder 6 the flow of shortening may immediately be resumed from the high pressure into the low pressure part of the system for filling.

An automatic filling machine of the type illustrated usually contains other elements besides those shown in the drawings, such as a start-stop switch for the motor, a clutch to disengage the filling column from its driving mechanism, pressure gauges, valves for completely isolating the machine from flow of shortening, connections with air and steam lines for blowing out all passages when shutting down for the night, lubricating mechanisms, and the like. Inasmuch as these are well known to those skilled in the art they will not be described.

The "floating" piston 9 is machined to fit the interior of cylinder 6 closely and yet have just sufficient clearance to permit this piston to slide freely back and forth in cylinder 6 for at least a distance equal to the length of the longer of the two slits, and from a position to the left (as viewed in Figures 1, 8, 11, and 13) such that it entirely covers both of slits 7 and 8, to a position to the right such that it entirely exposes both slits, the two extreme positions of the piston being limited by stops 31 and 32 appropriately placed in the cylinder. Inasmuch as the inlet and the outlet of metering pump 3 communicate through passages 2 and 5 respectively (which passages are of sufficiently large cross sectional area to cause no appreciable resistance to the flow of shortening) with the opposite ends of piston 9 in cylinder 6, and as this piston by sliding across and partially covering the outlet slits 7 and 8 is capable of varying the effective cross sectional area of these outlet ports, and hence the back pressure in the passage 5, it follows that this floating piston and these slits together function to maintain a pressure at the outlet of the metering pump exactly equal to the pressure at the inlet of this pump. If the supply pressure increases in inlet 1 the pressure in passage 2 will momentarily be higher than the pressure in the passage 5. The higher pressure in passage 2 will then cause piston 9 to advance toward passage 5, thus covering a greater portion of the two slits 7 and 8 and in consequence increasing the resistance to the flow of shortening through the slits and equalizing the pressure at both ends of the piston 9. If, on the other hand, the supply pressure decreases, the above action will be reversed. At all times the total of the exposed lengths of the slits is just sufficient to pass shortening at the uniform rate measured by the metering pump. Thus the variable length slits function as a flow control valve. As a result of the action of the floating piston and slitted ports in maintaining the pressure on the outlet of the metering pump equal to the pressure on its inlet, there is no tendency for shortening to leak through the volume measuring compartments enclosed between the teeth of the rotors and the surrounding pump block, or to leak past the ends of the rotors or past the floating piston, or past cylinder 6, even though the supply pressure in the pipe leading to inlet 1 varies widely. The total rate of flow of shortening through the slits 7 and 8 is therefore accurately regulated at a perfectly uniform rate as long as the speed of the pump remains constant, the desired rate being established by the capacity of the metering pump per revolution and the number of revolutions it makes per unit of time.

The means we employ to regulate the rate of flow of material, by varying the length of an elongated thin-walled slitted port through which the material flows, in response to changes in the pressure under which the material is supplied, accomplishes the regulation of flow without nearly as much variation in the abruptness of the pressure release as would be caused if the rate of flow were regulated by varying the width of a slitted port or the width of an orifice of any other shape. For the purpose of this abrupt pressure release a row of small holes, as indicated at 40 in Fig. 15, and of diameter about equal to the width of a slit, and having a combined cross sectional area about equal to that of a slit, may obviously be substituted as a satisfactory equivalent to the slitted port more generally illustrated. The essential characteristic is that there are provided an elongated throttling slitted port or ports.

Figure 4:
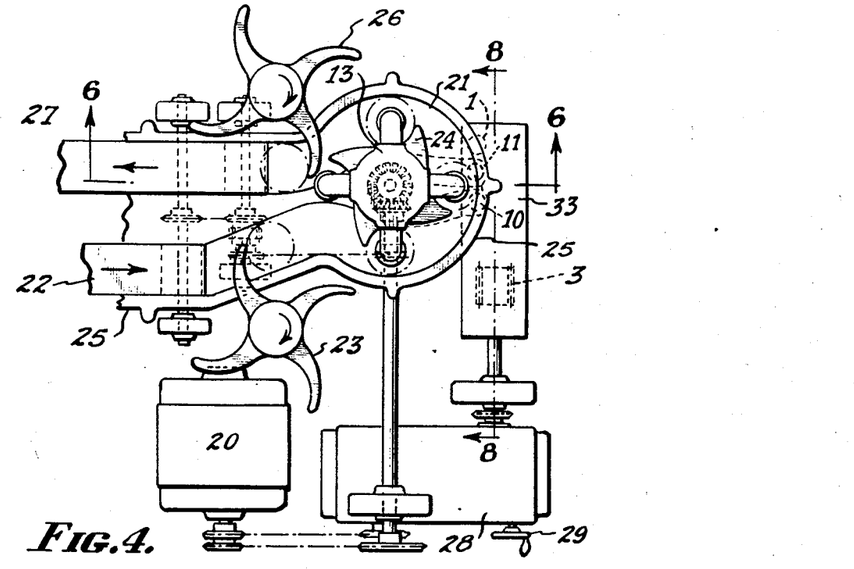
Figure 4 is a plan view of an actual filling machine with supporting frame members removed to show the more essential parts.
Figure 5:
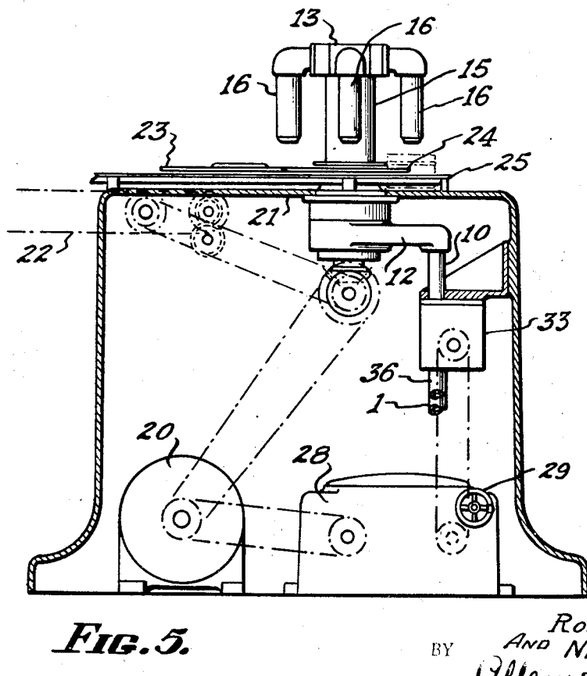
Figure 5 is an elevation view of the same filling machine, with the near end section of the supporting frame cut away to expose more essential operating parts.

The operation of the container filling column 13 is such, as will readily be understood from the illustrations and the foregoing description, that four containers complete their filling operation during every complete cycle or revolution of this column. The angular speed of rotation of the filling column controls the durations of the periods of time during which shortening may flow into a container, said periods of time obviously being inversely proportionate to this speed of rotation. The relation between the speed of rotation of the column and the rate of flow of fully compressed shortening through metering pump 3 determines the weight of shortening (the weight being directly proportional to the fully compressed volume at constant temperature) filled into each container. We therefore so establish the speed of the rotors of metering pump 3 in relation to the rotational speed of the filling column that while the column is turning just one revolution this pump will pass the amount of shortening desired to be filled into four containers. If, for example, the metering pump has a capacity of 0.40 pound of shortening per revolution and it is desired to fill three pounds of shortening into each container, then while the filling column turns one revolution the pump rotors must be caused to turn $$\frac{3 \text{ (lbs. per container)} \times 4 \text{ (containers/revolution of column)}}{0.40 \text{ (lb./revolution)}}$$

revolutions, i. e. 30 revolutions. In order to be sure that a constant relationship between the metering pump speed and filling column speed will be maintained, and hence that a constant inverse proportion will exist between the rate of flow of shortening and the durations of the filling time periods, (regardless of variations in mechanical load or in power line voltage which may cause variation in machine speeds) we prefer to drive both of these devices by means of a common source of motive power, for example, both by the same electric motor 20, in Figures 4 and 5, each through suitable speed reduction means. The speed reduction means connecting the motor and the metering pump is preferably of the variable ratio type as shown at 28, having a hand wheel 29 for initial adjustment of speed ratio, to permit establishing the rate of flow of shortening at any desired value in relation to the filling column rotational speed.

Figures 6, 7:
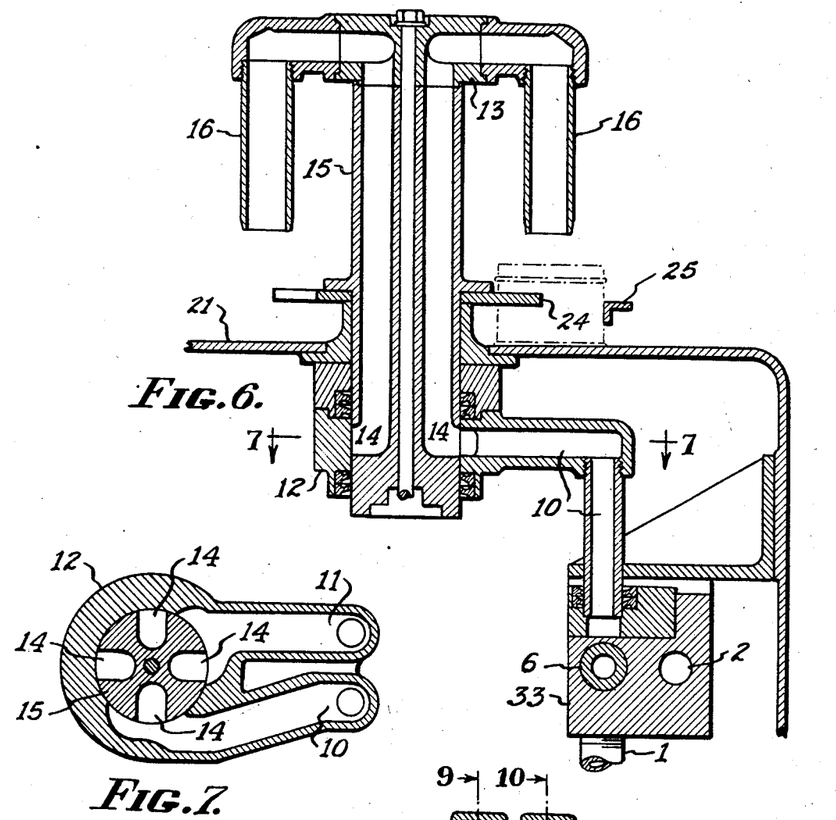
Figure 6 is a vertical section of parts of the machine on the line 6—6 of Fig. 4.
Figure 7 is a horizontal section on the line 7—7 of Fig. 6.
Figure 8:
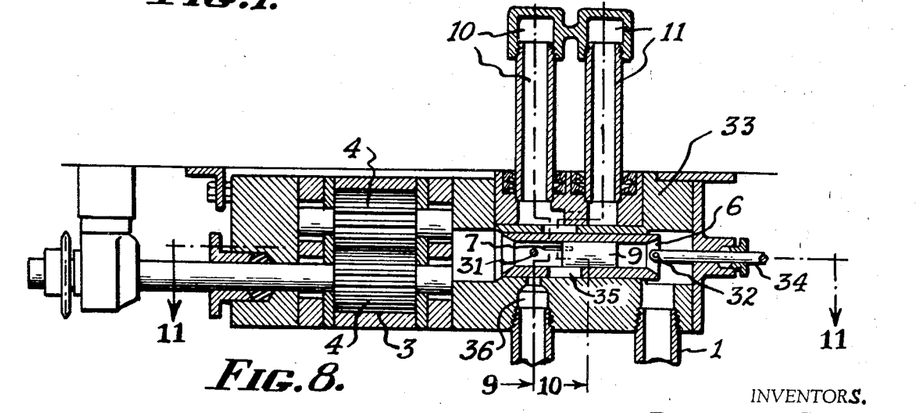
Figure 8 is a vertical section on the line 8—8 of Fig. 4.
Figure 9:
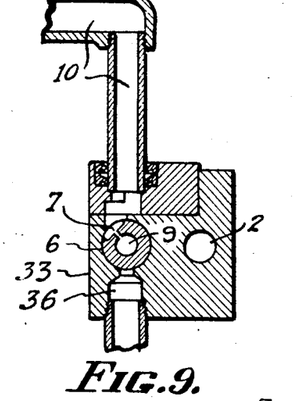
Figure 9 is a vertical section on the irregular line 9—9 of Fig. 8.
Figure 10:
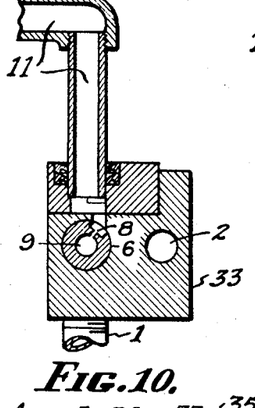
Figure 10 is a vertical section on the irregular line 10—10 of Fig. 8.

Referring now to Figures 2, 3, and 7, the design, dimensions and position of the outlet ends or openings of the two passages 10 and 11 in the concave cylindrical face of the stationary distributing block 12 are such that as the filling column rotates the central point of each of the four ports 14 is in communication with each of the openings for one-fourth of one revolution, and that at all times either one full port opening, or portions of two ports having a combined exposed cross sectional area substantially equal to the cross sectional area of one full port, are moving past and are in free communication with each of these passages 10 and 11. Thus there is no variation in the back pressure or the resistance to flow of shortening through passages 10 and 11 and ports 14, shaft 15, and nozzles 16, as the filling column rotates on its axis. The width of the dead space in the concave face of the distributing block between the two openings of passages 10 and 11 must be at least equal to the diameter of each of the ports 14 so that shortening cannot enter a single port from both passages at once.

As each container travels around the shaft of the filling column on the table 21 a portion of the shortening it is to receive flows into it while the nozzle above it is in communication through its port with passage 10 which receives shortening through slit 7. The remainder of the shortening it is to receive then flows into it while the same nozzle above it is in communication through the same port with passage 11 which receives shortening through slit 8. The relative amounts of shortening filled during the first and second of these two stages of the filling of each container depends directly on the relative exposed cross sectional areas of the one slit 7 to the other slit 8. Both slits may be equal in length and width, and located exactly side by side in cylinder 6, and in this case equal amounts of shortening will enter the container during the first and the second filling stages. We prefer, however, to have slit 8 which passes the shortening that fills the upper portion of the container, shorter than slit 7 which passes the shortening which fills the lower portion of the container, and to have the right ends of the two slits directly opposite one another (as shown in Figures 1 and 13): for with this arrangement of slits the stream velocity in the last stage of the filling of each container, which is the stage that most affects the top surface of the packed product, is lower than the stream velocity in the first stage of the filling. This multiple stage filling arrangement thus provides means for filling the upper and lower portions of containers at approximately predetermined relative rates.

It is obviously possible to vary the design of our automatic filling machine in many ways without departing from the advantageous principles which constitute the essence of our invention.

Obviously, the length of the two throttling slits could be equal, but one could be made slightly wider than the other so that the first one would always pass more shortening than the second in accurately predetermined ratio; or three slits of equal length and width could be employed, two of them passing shortening to the first filling stage and the third passing shortening to the second filling stage; or two slits of unequal actual length but extending an equal distance lengthwise of the cylinder could be provided by cutting the shorter slit parallel with the cylinder axis and the longer slit in an oblique or spiral direction. Furthermore three or more throttle slits could be employed, with a filling column so designed as to fill three or more containers simultaneously, each container being filled in three or more stages.

As an alternative we may provide an assembly having only one throttling slit, communicating with only one much elongated opening in the face of the distributing block and having the cross sectional area of this opening so reduced towards its farther limit as to reduce the stream velocity during the last portion of the filling period.

The filling column could obviously be made with more or less than four sets of ports and nozzles. The design of the distributing block and filling column are capable of other wide modifications, which will readily occur to those skilled in the art.

Our filling device and process are not necessarily limited to use in filling shortening, as they are adaptable and will be found useful in filling many other liquid and plastic materials, especially such materials as paints, varnishes, waxes, greases, cosmetic creams, margarine, peanut butter, jellies, and the like. When used with materials into which little or no excess air (vesiculated air), has been incorporated it is not necessary to maintain a higher pressure in the filling line than that required to substantially fully compress the material to a condition of constant density and to cause the material to flow through the filling device and out therefrom at the desired filling rate. Also, in this case, the dimensions of the slits in the outlet end of the pressure equalizing cylinder are not so critical and may be wider, deeper, and differently shaped than when used with shortening.

Having thus described our invention, what we claim and desire to secure by Letters Patent is:

1. A method of automatically filling containers with liquid, semi-liquid, or plastic material containing vesiculated gas, comprising the steps of: conducting the material to be filled through a flow-regulating step to a combined pressure-releasing and flow-dividing step under a superatmospheric pressure at least sufficiently high to cause substantially all of said gas to dissolve in said material; establishing the flow of said material at a substantially uniform rate; abruptly releasing substantially all of said superatmospheric pressure from the flowing material, while simultaneously dividing it into a plurality of separate streams, by causing it to pass quickly from said flow-regulating step into a corresponding plurality of zones of relatively low (but slightly higher than atmospheric) pressure; and directing each of said separate streams of material successively into each of successive containers in such a manner as to fill each container in a corresponding plurality of filling stages, each filling stage for one container extending over a controlled period of time, said periods for successive containers varying inversely with the total rate of flow of material through the flow-regulating step, each filling stage for one container beginning as the corresponding stage for the preceding container ends.

2. In a method of filling liquid, semi-liquid, or plastic material into containers, the steps of: applying pressure to the material to be filled to cause same to flow to a flow-dividing step, dividing said flowing material into a plurality of streams, and directing each of said streams successively into each of successive containers so as to fill each container in a corresponding plurality of filling stages.

3. In a method of filling liquid, semi-liquid, or plastic material into containers, the steps of: establishing a flow of said material at a rate which is unaffected by pressure changes in the supply of material, and directing this flowing material into each of successive containers for a controlled period of time, said periods for successive containers varying inversely with said rate of flow of material, whereby equal amounts of material are filled into all containers.

4. In a method of filling containers with liquid, semi-liquid, or plastic material containing vesiculated gas, the steps of: conducting the material to be filled through a high pressure zone to a pressure releasing step under a superatmospheric pressure at least sufficiently high to cause substantially all of said gas to dissolve in said material; abruptly releasing substantially all of said superatmospheric pressure from the flowing material by causing it to pass quickly from said high pressure zone through an elongated port into a zone of relatively low (but slightly higher than atmospheric) pressure, while maintaining a substantially uniform rate of flow through said elongated port by varying its length in response to changes in said high superatmospheric pressure; and directing the material flowing through said low pressure zone into each of successive containers for a period of time which begins as the corresponding period for the preceding container ends, whereby the flow through said low pressure zone is uninterrupted during the operation of filling a series of containers.

5. In a device for automatically filling containers with liquid, semi-liquid, or plastic material, which is supplied under sufficient superatmospheric pressure to cause same to flow through said device, in combination; means for regulating the flow of said material; means, on the outlet side of and cooperating with said flow regulating means, for dividing the flowing material into a plurality of separate streams, and means communicating with said flow dividing means for directing each of said streams of material successively into each of successive containers, said means being adapted to fill each container in a corresponding plurality of filling stages.

6. In a device for filling containers with flowing liquid, semi-liquid, or plastic material, in combination: automatic means for regulating the flow of said material at a rate which is unaffected by pressure changes in the supply of material; and automatic means communicating with said flow regulating means for directing said flowing material into each of successive containers for a controlled period of time, adapted by a cooperating connection between said flow regulating means and said directing means to vary said periods for successive containers in inverse proportion to said rate of flow so that equal amounts of material may be filled into all containers.

7. In a device for filling containers with a liquid, semi-liquid, or plastic material which contains vesiculated gas and which is supplied under a superatmospheric pressure at least sufficiently high to cause substantially all of said gas to dissolve therein, in combination: a chamber through which said material is supplied, having a variable-length elongated port adapted to pass said material to communicating passages defining a zone of relatively low pressure (slightly above atmospheric) in an abrupt pressure releasing step; means for automatically varying the length of said elongated port in response to changes in the pressure under which the material is supplied, adapted to regulate the flow of said material at a substantially uniform rate; and means communicating with said variable length port for directing the flow of material from said low pressure zone into each of successive containers for a period of time which begins as the period for the preceding container ends, said means thus being adapted to fill a series of containers without interrupting said flow from the low pressure zone.

8. In a method of filling liquid, semi-liquid, or plastic material into containers, the steps of establishing a flow of said material at a rate which is unaffected by pressure changes in the supply of material, dividing the flowing material into a plurality of streams and directing each of said streams successively into each of successive containers for a controlled period of time, said periods for each stream for successive containers varying inversely with said rate of flow of material, whereby all containers are filled, in a corresponding plurality of filling stages, with equal amounts of material.

9. In a method of filling containers with liquid, semi-liquid, or plastic material containing vesiculated gas, the steps of: conducting the material to be filled through a high pressure zone to a combined pressure releasing and flow dividing step under a superatmospheric pressure at least sufficiently high to cause substantially all of said gas to dissolve in said material; abruptly releasing substantially all of said superatmospheric pressure from the flowing material, while simultaneously dividing it into two separate streams, by causing it to pass quickly from said high pressure zone through two paths into two zones of relatively low (but slightly higher than atmospheric) pressure, while maintaining a substantially uniform total rate of flow through said high pressure zone by varying the cross sectional areas of said paths in response to changes in the high superatmospheric pressure; and conducting each of said streams successively into each of successive containers for a period of time which begins as the corresponding period for the preceding container ends, whereby the flow of each of said streams through its low pressure zone is uninterrupted during the operation of filling a series of containers, and each container is filled in two filling stages, the relative rates of flow of material in these two stages being determined by the relative cross sectional areas of the two paths.

10. In a device for automatically filling containers with liquid, semi-liquid, or plastic material which contains a vesiculated gas and which is supplied under a superatmospheric pressure at least sufficiently high to cause substantially all of said gas to dissolve therein, in combination: automatic means for regulating the flow of said material at a substantially uniform rate; a chamber containing said automatic flow regulating means, said chamber having a plurality of variable-length elongated outlet ports adapted to pass said material into passages defining a corresponding plurality of zones of relatively low pressure (slightly above atmospheric) in a corresponding plurality of parallel abrupt pressure releasing steps, said means for regulating the flow of material at a uniform rate including means for automatically varying the lengths of said elongated ports in response to changes in the pressure under which the material is supplied; and automatic means communicating with said variable length ports for directing the flow of material from each of said low pressure zones into each of successive containers for a controlled period of time, adapted by a cooperating connection between said flow regulating means and said directing means to vary said periods for successive containers in inverse proportion to said rate of flow, said means also being so adapted that each of said periods of time for each zone for one container begins as the corresponding period for the preceding container ends.

11. In a device for automatically filling containers with flowing liquid, semi-liquid, or plastic material, in combination: automatic means for regulating the flow of said material at a rate which is unaffected by pressure changes in the supply of material; means in communication with said flow regulating means for dividing the flowing material into a plurality of separate streams; and automatic means communicating with said flow directing means for directing each of said streams of material into each of successive containers for a controlled period of time, adapted by a cooperating connection between said flow regulating means and said directing means to vary said periods for successive containers in inverse proportion to said rate of flow so that all containers may be filled in a corresponding plurality of filling stages with equal amounts of material.

12. In a device for automatically filling containers with a liquid, semi-liquid, or plastic material which contains vesiculated gas and which is supplied under a superatmospheric pressure at least sufficiently high to cause substantially all of said gas to dissolve therein, in combination: a high pressure chamber through which said material is supplied, having two variable-length elongated outlet ports adapted to divide the flowing material into two separate streams while simultaneously quickly passing each of said streams into a corresponding one of two enclosed conduits constituting zones of relatively low pressure (slightly above atmospheric) in an abrupt pressure releasing step; means for automatically varying the lengths of said elongated ports in response to changes in the pressure under which the material is supplied, adapted to regulate the total flow of material through said high pressure chamber at a uniform rate; and means for directing each of said streams of material into each of successive moving containers adapted to fill each container in two filling stages, the rate of flow of one stage relative to that of the other being determinable from the relative lengths of the two elongated ports, said directing means also being adapted to begin each filling stage for one container as the corresponding filling stage for the preceding container ends, said means comprising said two enclosed conduits and a plurality of nozzles, each of said nozzles being adapted to communicate periodically and for a determinable period of time with first the one and then the other of said conduits, and each adapted while in communication with said conduits to move above and in timed relation to one of said successive moving containers.

13. In a device for filling containers with a liquid, semi-liquid, or plastic material which contains a vesiculated gas and which is supplied under a superatmospheric pressure at least sufficiently high to cause substantially all of said gas to dissolve therein, in combination: a high pressure chamber through which said material is supplied, having a variable-length elongated outlet port adapted to pass said material to communicating passages defining a zone of relatively low pressure (slightly above atmospheric) in an abrupt pressure releasing step; means for automatically varying the length of said elongated port in response to changes in the pressure under which the material is supplied, adapted to regulate the flow of said material at a substantially uniform rate; means communicating with said variable length port for directing the flow of material from said low pressure zone into each of successive containers for a period of time which begins as the period for the preceding container ends; and means for temporarily discontinuing the flow of material through said variable-length elongated port while simultaneously by-passing said material after its passage through said high pressure chamber to an overflow tank, said means being reversible so that the flow through said elongated port may be resumed and the flow to said overflow tank discontinued.

14. A dispensing process for gasified liquids which comprises forcing the liquid under sufficient superatmospheric pressure to cause the gas to remain dissolved in the liquid through a continuous volumetric measuring stage in which the pressure is equalized before and after the volumetric measuring, discharging the liquid in a plurality of streams under reduced pressure wherein the quantity discharged is compensated relative to the pressure equalization before and after volumetric measurement, and discharging in sequence for a timed interval under the reduced pressure a portion of the liquid from each stream into each of a plurality of moving containers.

15. A device for automatically filling containers with flowing liquid, semi-liquid, or plastic material, comprising the following elements: a chamber through which said material is supplied and in which its flow is regulated at a rate substantially unaffected by pressure changes in the supply of material, said chamber having a plurality of outlet ports; a fixed distributing block having a plurality of elongated openings in its face; an enclosed conduit leading from each of said outlet ports to the corresponding one of said plurality of elongated openings; and a rotating filling column driven at a speed proportionate to the total rate of flow of material through said chamber and comprising a receiving element having a face conforming in shape with and in sliding contact with said face of said distributing block and having a plurality of uniformly spaced inlet ports opening through its face, said inlet ports being aligned so as to communicate periodically with the elongated openings of said distributing block as said column rotates on its axis, a plurality of nozzles, and means providing a plurality of passages, each leading from one of said inlet ports to one of said nozzles; said combination of elements being adapted to pass the supplied material from said chamber as a plurality of separate streams through said outlet ports and said conduits to said distributing block, and to pass each of said streams of material through one of said elongated openings into one of the inlet ports of the receiving element of said rotary filling column, and thence to one of said nozzles, and to discharge said stream from said nozzle into successive containers positioned below it and moving in timed relation thereto.

16. A device for filling containers with flowing liquid, semi-liquid, or plastic material, comprising: a motor; a metering pump independently driven by said motor at substantially constant speed; an automatic pressure equalizing means adapted to maintain a pressure on the outlet of said pump equal to the pressure on its inlet, said pump and pressure equalizer thus being adapted to regulate the flow of said material at a substantially uniform rate; a fixed distributing block having an elongated opening in its face; an enclosed conduit leading from said flow regulating means to said elongated opening; and a rotating filling column driven by said motor at a speed proportionate to the speed of said pump and comprising a receiving element having a face conforming in shape with and in sliding contact with said face of said distributing block and having a plurality of uniformly spaced inlet ports opening through its face, said inlet ports being aligned so as to communicate periodically with the elongated opening of said distributing block as said column rotates on its axis, a plurality of nozzles, and means providing a plurality of passages, each leading from one of said inlet ports to one of said nozzles; said combination of elements being adapted to pass said material from said flow regulating means through said conduit to said distributing block and through the elongated opening thereof into one of the inlet ports of the receiving element of said rotary filling column, and thence to one of said nozzles, and to discharge said stream from said nozzle into successive containers positioned below it and moving in timed relation thereto.

17. A device for filling containers with a liquid, semi-liquid, or plastic material which contains vesiculated gas and which is supplied under a superatmospheric pressure at least sufficiently high to cause substantially all of said gas to dissolve therein, comprising the following elements: a motor; a cylinder, in the wall of which is located in a lengthwise direction a variable-length elongated port adapted to pass said material into an enclosed conduit defining a zone of relatively low pressure (slightly above atmospheric) in an abrupt pressure releasing step; means for automatically varying the length of said elongated port in response to changes in the pressure under which the material is supplied, adapted to regulate the flow of said material at a substantially uniform rate, said means including a metering pump independently driven by said motor at substantially constant speed, the inlet and outlet portions of said pump being in free communication with the spaces at the respective ends of said cylinder, a freely sliding but close fitting piston in said cylinder, and stops for restricting the limits of travel of said piston so that at one extreme it covers said variable length port and cuts off the outlet of said pump and at the other extreme it exposes said port and leaves said outlet in communication through said port with said low pressure conduit; a fixed distributing block having an elongated opening in its face; said enclosed conduit, leading from said variable length port to said elongated opening; and a rotating filling column driven by said motor at a speed proportionate to the speed of said metering pump and comprising a receiving element having a face conforming in shape with and in sliding contact with said face of said distributing block and having a plurality of uniformly spaced inlet ports opening through its face, said inlet ports being aligned so as to communicate periodically with the elongated opening of said distributing block as said column rotates on its axis, a plurality of nozzles, and means providing a plurality of passages each leading from one of said inlet ports to one of said nozzles; said combination of elements being adapted to pass said material through said metering pump and said variable length port and said conduit to said distributing block and through the elongated opening thereof into one of the inlet ports of the receiving element of said rotary filling column, and thence to one of said nozzles, and to discharge said stream from said nozzle into successive containers positioned below it, and moving in timed relation thereto, for a period of time which begins as the corresponding period for the preceding container ends.

18. A device for filling containers with a liquid, semi-liquid, or plastic material which contains vesiculated gas and which is supplied under a superatmospheric pressure at least sufficiently high to cause substantially all of said gas to dissolve therein, comprising the following elements: a motor; a cylinder, in the wall of which are located a plurality of variable-length elongated ports, each adapted to pass a portion of said material into a corresponding one of a plurality of enclosed conduits of relatively low pressure (slightly above atmospheric) in an abrupt pressure releasing step, means for automatically varying the lengths of said elongated ports in response to changes in the pressure under which the material is supplied, adapted to regulate the flow of said material at a substantially uniform rate, said means including a metering pump independently driven by said motor at substantially constant speed, the inlet and outlet portions of said pump being in free communication with the spaces at the respective ends of said cylinder, a freely sliding but close fitting piston in said cylinder, and stops for restricting the limits of travel of said piston so that at one extreme it covers said variable length ports and cuts off the outlet of said pump and at the other extreme it exposes said ports and leaves said outlet in communication through said ports with said low pressure conduits; a fixed distributing block having a plurality of elongated openings in its face; said enclosed conduits, each leading from one of said variable length ports to one of said elongated openings; and a rotating filling column driven by said motor at a speed proportionate to the speed of said metering pump and comprising a receiving element having a face conforming in shape with and in sliding contact with said face of said distributing block and having a plurality of uniformly spaced inlet ports opening through its face, said inlet ports being aligned so as to communicate periodically with the elongated openings of said distributing block as said column rotates on its axis, a plurality of nozzles, and means providing a plurality of passages each leading from one of said inlet ports to one of said nozzles; said combination of elements being adapted to pass said material through said metering pump, to divide it into a plurality of separate streams while passing it through said variable length ports and said conduits to said distributing block, and to pass each of said streams of material into one of the inlet ports of the receiving element of said rotary filling column, and thence to one of said nozzles, and to discharge said stream from said nozzle into successive containers positioned below it, and moving in timed relation thereto, for a period of time which begins as the corresponding period for the preceding container ends.

19. A device for filling containers with a liquid, semi-liquid, or plastic material which contains vesiculated gas and which is supplied under a superatmospheric pressure at least sufficiently high to cause substantially all of said gas to dissolve therein, comprising the following elements: a motor; a cylinder, in the wall of which in a lengthwise direction is located a variable length elongated port adapted to pass said material into an enclosed conduit defining a zone of relatively low pressure (slightly above atmospheric) in an abrupt pressure releasing step; means for automatically varying the length of said elongated port in response to changes in the pressure under which the material is supplied adapted to regulate the flow of said material at a substantially uniform rate, said means including a metering pump independently driven by said motor at substantially constant speed, the inlet and outlet of said pump being in free communication with the spaces at the respective ends of said cylinder, a freely sliding but close fitting piston in said cylinder, and stops for restricting the limits of travel of said piston so that at one extreme it covers said variable length port and cuts off the outlet of said pump and at the other extreme it exposes said port and leaves said outlet in communication through said port with said low pressure conduit; a fixed distributing block having an elongated opening in its face; said enclosed conduit, leading from said variable length port to said elongated opening; and a rotating filling column driven by said motor at a speed proportionate to the speed of said metering pump and comprising a receiving element having a face conforming in shape with and in sliding contact with said face of said distributing block and having a plurality of uniformly spaced inlet ports opening through its face, said inlet ports being aligned so as to communicate periodically with the elongated opening of said distributing block as said column rotates on its axis, a plurality of nozzles, and means providing a plurality of passages each leading from one of said inlet ports to one of said nozzles; each of which is so placed as to be adapted to discharge the material to be filled into a container positioned below it; said combination of elements being adapted to pass said material through said metering pump and said variable length port and said conduit to said distributing block and through the elongated opening thereof into one of the inlet ports of the receiving element of said rotary filling column, and thence to one of said nozzles, and to discharge said stream from said nozzle into successive containers positioned below it, and moving in timed relation thereto, for a period of time which begins as the corresponding period for the preceding container ends; said container filling device comprising also means for temporarily discontinuing the flow of material through said variable-length port, while simultaneously by-passing said material, after its passage through said pump, to an overflow tank, said means being reversible so that flow through said port may be resumed and the flow to said overflow tank discontinued.

20. A device for filling containers with shortening which contains vesiculated gas and which is supplied under a superatmospheric pressure at least sufficiently high to cause substantially all of said gas to dissolve therein, comprising the following elements: a motor; a cylinder, in the wall of which are located two elongated ports, the one always longer than the other, each adapted to pass a portion of said shortening into a corresponding one of two enclosed conduits defining zones of relatively low pressure (slightly above atmospheric) in an abrupt pressure releasing step, means for automatically varying the lengths of said elongated ports in response to changes in the pressure under which the shortening is supplied, adapted to regulate the flow of said shortening at a substantially uniform rate, said means including a metering pump independently driven by said motor at substantially constant speed, the inlet and outlet of said pump being in free communication with the spaces at the respective ends of said cylinder, a freely sliding but close fitting piston in said cylinder, and stops for restricting the limits of travel of said piston so that at one extreme it covers said elongated ports and cuts off the outlet of said pump and at the other extreme it exposes said ports and leaves said outlet in communication through said ports with said low pressure conduit; a fixed distributing block having two elongated openings in its face; said two enclosed conduits, each leading from one of said elongated ports in the cylinder wall to one of said elongated openings in the distributing block; and a rotating filling column driven by said motor at a speed proportionate to the speed of said metering pump and comprising a receiving element having a face conforming in shape with and in sliding contact with said face of said distributing block and having four uniformly spaced inlet ports opening through its face, said inlet ports being aligned so as to communicate periodically with the elongated openings of said distributing block as said column rotates on its axis, four nozzles, and means providing four passages each leading from one of said inlet ports to one of said nozzles; said combination of elements being adapted to pass said shortening through said metering pump, to divide it into two separate streams while passing it through said elongated ports in the cylinder wall and through said conduits to said distributing block, and to pass each of said streams of shortening into one of the inlet ports of the receiving element of said rotary filling column, and thence to one of said nozzles, and to discharge said stream from said nozzle into successive containers positioned below it, and moving in timed relation thereto, for a period of time which begins as the corresponding period for the preceding container ends; said shortening filling device comprising also means for temporarily discontinuing the flow of shortening through said elongated ports in the cylinder wall, while simultaneously by-passing said shortening, after its passage through said metering pump, to an overflow tank, said means being reversible so that flow through said elongated ports may be resumed and the flow to the overflow tank discontinued.

21. In a container filling device of the character described, a flow regulator for the material being filled, comprising: a rotary metering pump independently driven at substantially constant speed; and an automatic pressure equalizer comprising a cylinder whose ends communicate freely with the inlet and outlet respectively of said pump, a port cut through the wall of said cylinder, passages directing the flow of said material through said pump and through said port, a freely sliding but close fitting piston in said cylinder adapted to slide back and forth across said port in response to pressure variations on the opposite ends of said piston, thus varying the exposed area of said port and thus varying the pressure on the material in that end of the cylinder in which the port is located, said variations in exposed area of said port being such as to equalize the pressure on the material entering and leaving said metering pump.

ROBERT V. BURT.
NEIL MACNEALE.